United States Patent [19]
Roberts

[11] Patent Number: 6,010,458
[45] Date of Patent: Jan. 4, 2000

[54] SPIROMETER FILTER MEDIA AND DEVICE

[75] Inventor: Keith A. Roberts, St. Paul, Minn.

[73] Assignee: Porous Media Corporation, St. Paul, Minn.

[21] Appl. No.: 09/069,408

[22] Filed: Apr. 29, 1998

Related U.S. Application Data

[60] Provisional application No. 60/045,473, May 2, 1997.

[51] Int. Cl.[7] .......................... B01D 27/06; B01D 29/085; B01D 46/02; A61B 5/08; A61B 7/10
[52] U.S. Cl. .................... 600/529; 600/538; 128/205.29; 55/378; 55/379; 55/381; 210/493.5; 210/497.3
[58] Field of Search ..................................... 600/538, 543, 600/529, 531, 532, 533, 540, 541; 128/205.12, 205.28, 205.29, 205.27, 206.16, 206.17; 55/378, 379, 381, 382; 210/493.1, 493.5, 497.3

[56] References Cited

U.S. PATENT DOCUMENTS

| | | | |
|---|---|---|---|
| 4,959,045 | 9/1990 | Hartley et al. | 493/254 |
| 5,156,661 | 10/1992 | Adiletta | 55/381 |
| 5,647,370 | 7/1997 | Harnoncourt | 600/538 |
| 5,830,119 | 11/1998 | Chen | 493/210 |

OTHER PUBLICATIONS

Pro-Tec™ Barrier Filter for Pulmonary Function Testing; BC-PF30S Flyer; ©Copyright 1989, Pall Corporation.
Pro-Tec™ Barrier Filter for Pulmonary Function Testing; Pall Biomedical Products Corporation.
3420 Pulmoguard PFT Filter; p. 6 of 6.

Primary Examiner—Cary O'Connor
Assistant Examiner—Navin Natnithithadha
Attorney, Agent, or Firm—Marshall & Melhorn

[57] ABSTRACT

The present invention is a spirometer mouthpiece assembly having a bag or sock filter medium. A support mechanism is incorporated into the assembly to prevent the filter medium from becoming dislodged during use. This not only protects the user of the spirometer, it also helps prevent contamination.

The present invention consists of a spirometer mouthpiece having an interior conduit, a filter medium having an exterior and interior. The filter medium also has a rim portion and bag portion. Lastly, the device has a rigid support mechanism. The filter medium is attached to the interior conduit of the mouthpiece. The support mechanism may be attached to the filter medium or the interior conduit of the mouthpiece. If the support mechanism is attached to the mouthpiece, the filter medium is disposed adjacent the support mechanism.

22 Claims, 5 Drawing Sheets

SPIROMETER FILTER MEDIA AND DEVICE

CROSS REFERENCE TO RELATED APPLICATIONS

This application is claiming the benefit under 35 U.S.C. §119(e) of the provisional application filed May 2, 1997 under 35 U.S.C. §111(b), which was granted Ser. No. 60/045,473. The provisional application, Ser. No. 60/045,473 is incorporated herein by reference.

BACKGROUND OF THE INVENTION

1. Field of the Invention

The present invention relates generally to spirometers. Spirometers are devices used to measure lung capacity and other functions of the lungs in patients with various pulmonary disorders. More particularly, the invention relates to a filtration device for spirometers which is placed between the patient and the spirometer to avoid contamination of the spirometer by mucous droplets exhaled by the patient. Most particularly, the present invention relates to a reinforced filter media, and a filtration device using the same, for use by the patient with the Spirometer to prevent the aforementioned contamination problem.

2. Description of Prior Art

Researchers are currently looking for accurate methods to predict a person's chances of developing various airway obstructions. These obstructions are sometimes called chronic obstructive pulmonary disease (COPD). None of the current ways used to diagnose COPD detects the disease before irreversible lung damage occurs. While many measures of lung function have been developed, those most commonly used determine: 1) air containing volume of the lung (lung volume), 2) the ability to move air into and out of the lungs, 3) the rate at which gas is defused between the lung and the blood, and 4) blood levels of oxygen and carbon dioxide.

Lung volumes are measured by breathing into and out of a device called a spirometer. Some types of spirometers are very simple mechanical devices which record volume changes as air is added to or removed from them. Other kinds of spirometers are more sophisticated and use various types of electronic equipment to determine and record the volume of air moved into and out of the lungs. Three volume measures most relevant to COPD are forced vital capacity (FVC), residual volume (RV), and total lung capacity (TLC). The forced vital capacity is the maximum volume of air which can be forcibly expelled after inhaling as deeply as possible.

Not all of the air in the lungs is removed when measuring the vital capacity. The amount remaining is called the residual volume. The total lung capacity is the combination of the forced vital capacity and residual volume. While most of the measured lung volumes or capacities change to some degree with COPD, residual volume usually increases quite markedly. This increase is the result of the weakened air ways collapsing before the normally expired air can leave the lungs. The increased residual volume makes breathing even more difficult and labored.

Because COPD results in narrowed air passages, a measure of the rate at which air can be expelled from the lungs can also be used to determine how severe the narrowing has become. In this test, the forced vital capacity maneuver, the patient is asked to inhale as deeply as possible and, on signal, exhale as completely and as rapidly as possible. The volume of air exhaled within one second is then measured. This volume is referred to as the forced expiratory volume in one second (FEV1). When FEV1 is used as an indicator as lung function, the average rate of decline in patients with chronic obstructive lung disease is observed to be two or three times the normal rate of 10–30 ml per year. This volume may also be expressed in terms of the percent of the vital capacity which can be expelled in one second. As COPD progresses, less air can be expelled in one second. A greater than expected annual fall in FEV1 is the most sensitive test for COPD and a fairly good predictor of disability and early death.

Another measure of lung function is called the fusing capacity. For this, a more complicated test determines the amount of gas which can move in a given period of time from the alveolar side of the lung into the blood. A number of conditions can cause the defusing capacity to decrease. However, in COPD the decrease is the result of the destruction of the alveolar walls which leads to a significant decrease in surface area for defusion of oxygen into the blood.

Because the primary function of the lung is to remove carbon dioxide from the blood and add oxygen, another indicator of pulmonary function is the blood levels of oxygen and carbon dioxide. As chronic obstructive pulmonary disease progresses, the amount of oxygen in the blood decreases and carbon dioxide increases.

In most cases it is necessary to compare the results of several different tests in order to make the correct diagnosis, and to repeat some tests at intervals to determine the rate of disease progression or improvement. Measurement of the FEV1 and FEV1/FVC ratio is becoming a routine part of the physical examination of every patient suspected of having COPD.

It can be easily understood that testing of patients for potential COPD is increasing the use of spirometers. The increased use of spirometers has developed the problem of how to prevent the contamination of the spirometers between tests so as to avoid a lengthy and expensive cleaning procedure between patient tests and the resulting costly downtime of the spirometers.

One attempted solution to the problem of preventing contamination of the spirometer devices has been to insert an in-line filter between the mouthpiece used by the patient to blow into the spirometer and the flexible tube connecting the mouthpiece to the spirometer. The number 3420 Pulmoguard PFT filter distributed by Vacumetrex of Ventura, Calif. is one example of such a filter. The Pro-tec™ barrier filter manufactured by Pall Biomedical Products Corporation of Glencove, N.Y. is another example of an in-line filter. These are disposable filters which have been proven to be efficient and do prevent contamination of the spirometers. However, they add substantial cost to the overall expense of testing the ever growing number of patients being tested for COPD and thus they have not been an entirely satisfactory solution.

Another attempt at solving the problem of contamination has been to combine a bag or sock filter with the mouthpiece commonly used by the patient in connection with a spirometer test. Such a combination mouthpiece filter is manufactured by the Mallincrodt Medical Company of Mirandola, Italy. While this has been a generally satisfactory solution to the problem, as it eliminates contamination of the spirometer, and does not involve the increased cost of the disposable in-line filter, when such a combination mouthpiece/filter is used in certain tests, such as the FEC test where the patient is asked to inhale as deeply as possible, the filter media used in the mouthpiece/filter has become dislodged from its normal position within the mouthpiece, and has been sucked into the patient's mouth. Thus, this has also not been an entirely satisfactory solution to the problem of avoiding contamination of spirometers. Thus, those skilled in the art continue to search for a satisfactory method of eliminating the contamination problem in Spirometers during testing for COPD and other various pulmonary disorders.

SUMMARY OF THE INVENTION

A support mechanism for a bag or sock shaped filter media is provided, together with a mouthpiece filter assembly utilizing the same.

In one embodiment of the present invention, a support mechanism, such as a mesh or screen, is provided on at least a portion of the interior and/or exterior of a bag or sock shaped filter.

In another embodiment of the invention, a bag or sock shaped filter of a one or multiple piece construction has a suitable mesh or screen suitably fastened about the periphery of the filter on the inside or outside of one or both sides of the filter media.

In another embodiment of the invention, a filter media of the foregoing nature is attached to the interior of a mouthpiece used during tests to measure lung capacity and other functions of the lungs in patients with various pulmonary disorders.

In another embodiment of the present invention, a rigid support mechanism is affixed to a mouthpiece on the interior thereof, and a filter media is placed adjacent the support mechanism.

Thus, it is an object of the present invention to provide a suitably supported filter media for use in connection with spirometers and other devices used in the testing of patients with various pulmonary disorders.

Another object of the present invention is to provide a support mechanism and filter media of the foregoing nature attached to a mouthpiece used in connection with a spirometer to protect the spirometer from contamination.

Further objects and advantages of this invention will be apparent from the following description and appended claims, reference being made to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood, that the phraseology and terminology employed herein is for the purposes of description, and not of limitation.

DESCRIPTION OF THE PREFERRED EMBODIMENT

Figure 1:
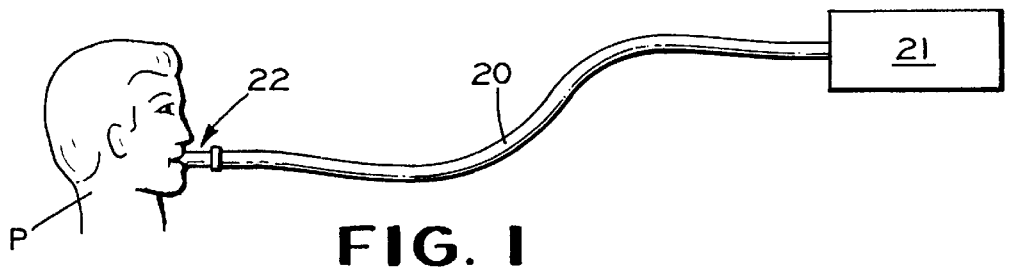
FIG. 1 is diagrammatic view showing a patient undergoing pulmonary testing with a spirometer.

Referring to FIG. 1, there is shown a typical set up for pulmonary testing. The patient P is connected by tubing 20 to spirometer 21. A mouthpiece 22, which is typically a disposable mouthpiece, is removably connected to the tubing 20 and held by the patient P in his mouth during the subsequent testing. Because the patient P is directly connected to the spirometer 21, there is nothing protecting the tubing 20 or the spirometer 21 from virus laden micro droplets exhaled by the patient during testing.

Figure 2:
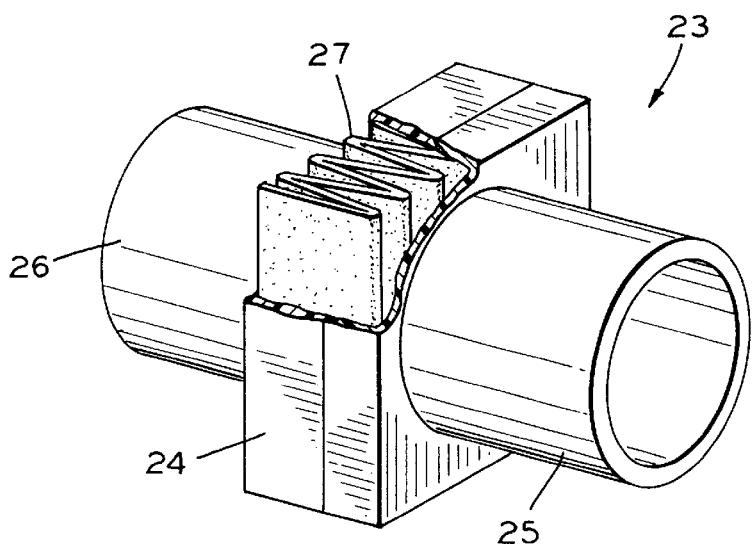
FIG. 2 is a fragmentary perspective view of a prior art, pleated, in-line spirometer filter.
Figure 3:
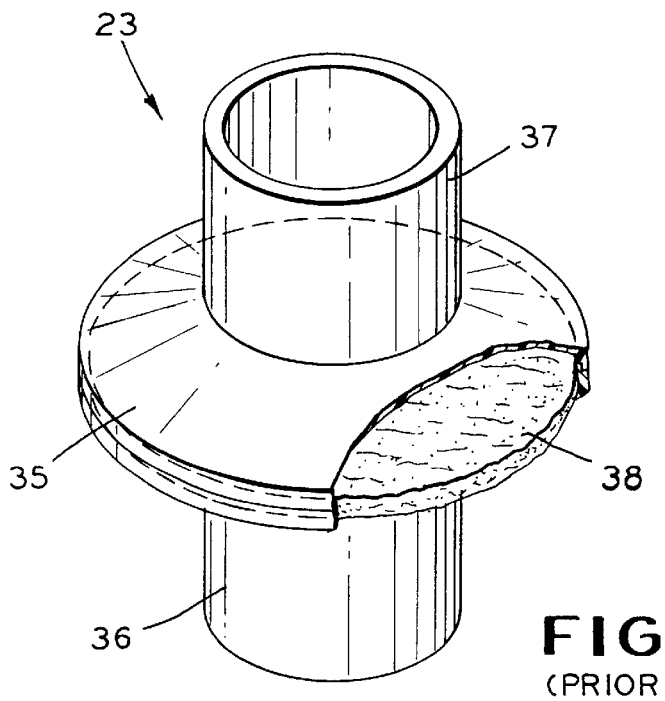
FIG. 3 is a perspective view of a prior art, circular, in-line spirometer filter.

As concern over contamination of the spirometer 21, and possible cross-contamination among various patients P begin to arise, it was realized by those skilled in the art that some type of filtration device to protect against contamination problems would need to be inserted in the spirometer circuit shown in FIG. 1. FIGS. 2 and 3 show types of in line filters 23 which were developed in an attempt to solve the problem. FIGS. 2 shows a typical box filter 24 having an inlet 25 and an outlet 26 with a pleated filter media 27. The number 3420 Pulmoguard PFP filter distributed by Vacumetrex of Ventura, Calif., and the Pall Pro-tec™ barrier filter manufactured by Pall Biomedical Products Corporation are examples of box filters 24 which are used in pulmonary testing circuits.

With reference to FIG. 3 there is shown a circular in-line filter 35 having an inlet 36, an outlet 37, and containing a circular disk of a flat, unsupported, filter media 38. The circular in-line filter 35 can easily be used in place of the box filter 24 shown in FIG. 2.

Figure 4:
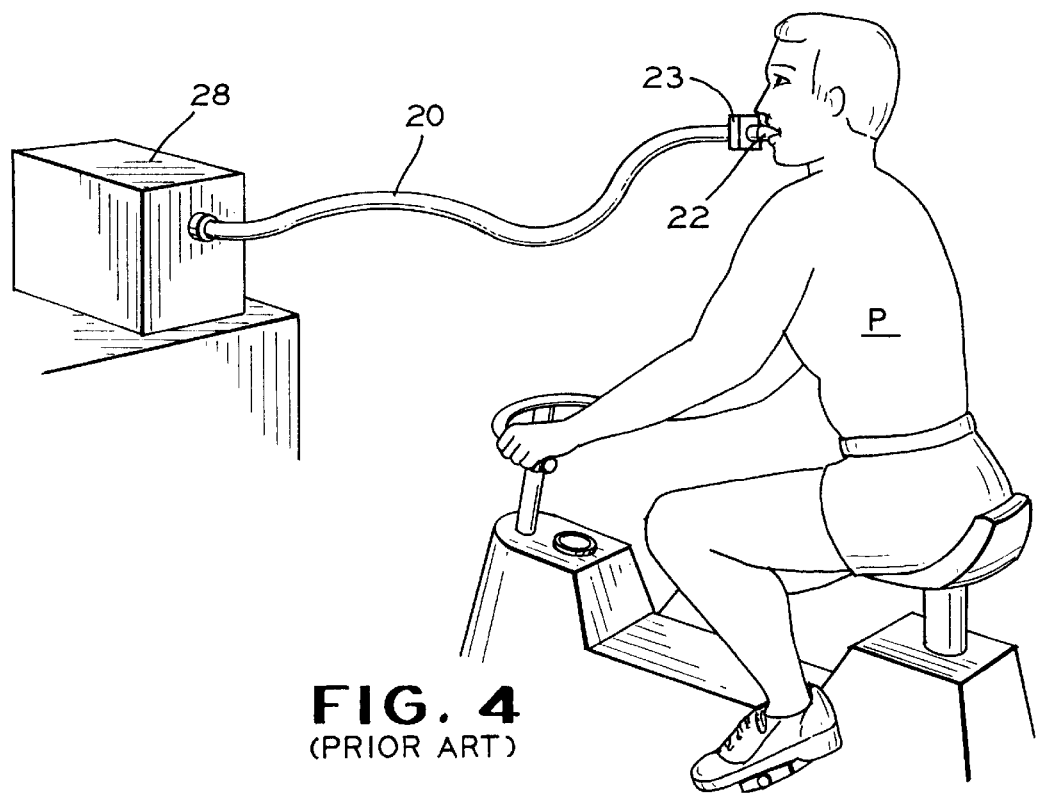
FIG. 4 is a diagrammatic view of a patient undergoing pulmonary stress testing using an apparatus equipped with an in line filter.
Figure 5:
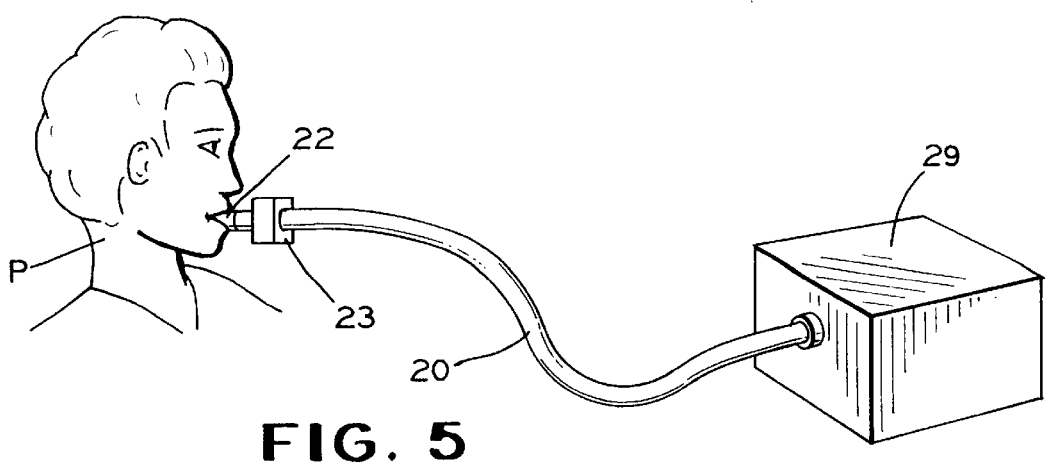
FIG. 5 is a diagrammatic view of a patient undergoing pulmonary function testing using an apparatus having an in-line filter.

Examples of the use of such in-line filters 23 are shown in FIGS. 4 and 5. With reference to FIG. 4, patient P is connected through mouthpiece 22, in line filter 23, and tubing 20 to stress testing spirometer 28.

Shown in FIG. 5 is a patient P connected through mouthpiece 22, in-line filter 23, and tubing 20 to pulmonary function testing spirometer 29. It can be understood by those skilled in the art that although identical numbers have been used for mouthpiece 22, in-line filter 23, and tubing 20, the dimension and shapes of these items may vary depending on the type of spirometer and type of test that is being formed.

The in-line filter was a generally satisfactory way to solve the problem of the contamination of the spirometers used in pulmonary function testing. However, its use represented an added cost. Individually, the in-line filters were of reasonable cost. However, this cost, when multiplied by the number of such tests given annually, added millions of dollars to health care costs in the United States alone. Thus, the solution while satisfactory from the point of trapping bacteria and viruses was not satisfactory from a cost stand point.

Figure 6:
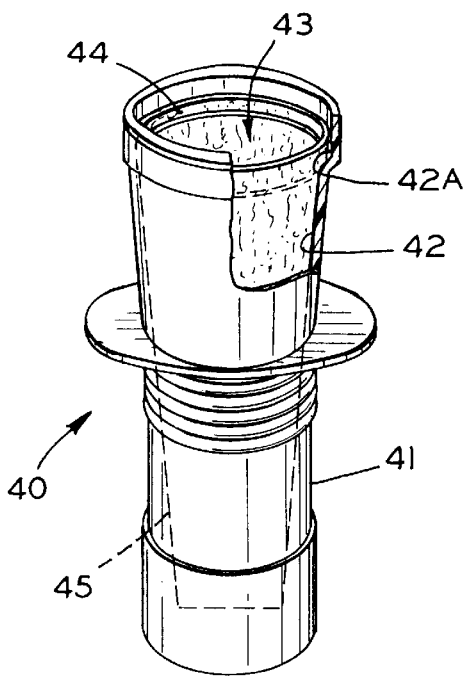
FIG. 6 is a diagrammatic view of a prior art mouthpiece/filter assembly.
Figure 7:
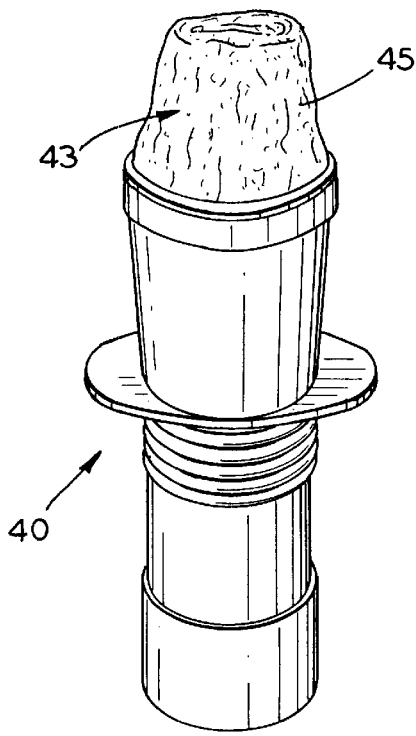
FIG. 7 is a view of the construction shown in FIG. 6, and illustrating the unsupported filter media becoming deformed and inhaled out of the mouthpiece due to heavy inhalation.

The next attempted solution to the problem of contamination of spirometers is shown in FIGS. 6 and 7. Since a mouthpiece had to be provided for each test it was thought that placing a bag or sock type filter in the interior of the mouthpiece would be a much more cost effective solution because it eliminated the need for a separate in-line filter 23 and the mouthpiece 22 had to be disposed of anyway.

Referring to FIG. 6, there is shown a prior art mouthpiece filter assembly 40, which was an attempt to solve the contamination problem without introducing the separate in-line filter 23. The mouthpiece filter 40 has a housing portion 41 having at least a conduit portion 42 having an interior periphery 42A. A filter sock or bag 43 is provided having a rim portion 44 and a bag or sock portion 45. The rim portion 44 is heat staked to the interior periphery 42A of the conduit portion 42 of the mouthpiece filter 40.

Referring to FIG. 7, the problem with this prior art solution may be observed. It can be seen that during heavy inhalation by a patient P, the bag or sock portion 45 of the filter sock or bag 43 is caused to move by the vacuum created by the patient from the conduit portion 42 of the mouthpiece filter 40, and move outside the housing 41 thereof and enter the patient's mouth. This ocurrs even though the rim portion 44 stays attached to the interior periphery 42A of the conduit portion 42 of the mouthpiece filter assembly 40. This is obviously a very uncomfortable and surprising occurrence to the patient P. Besides being alarming to the patient P, such an occupance aborts the testing which the patient is undergoing, requiring that it be repeated at increased time and expense to the patient and his insurer. Obviously, this problem which has just come to the fore, has caused a lot of concern and attempts by those skilled in the industry to solve the same. It is believed that the present invention does solve this problem in the art by supporting the filter sock or bag 43 within the mouthpiece filter assembly 40.

It is believed that this problem is caused because the filter media used to make the filter sock or bag 43 is unsupported. As a result of the unsupported media it is believed that if the patient inhales hard enough, the filter medium can be dislodged and inhaled into the patient's mouth. To combat this problem, the present invention incorporates a support mechanism which is rigid enough to prevent deformation of the filter medium.

The filter medium used in the present invention can be any filter medium that is common to the art, including electrostatic medium, whether woven, non-woven or synthetic, etc. The electrostatic medium can be either an electret filter medium or a triboelectric filter medium. Although an electrostatic medium is preferred so as to provide a low resistance filter that protects the spirometer from patient mucous, thereby preventing contamination and costly repairs, other filter media may be used. Any filter media capable of accepting a charge is suitable.

The support mechanism to be described can be separate or integral with the filter media, and can be any type of material that prevents the filter media from deforming so much as to migrate into the patient's mouth. The support mechanism can be attached to the filter medium, or it can be secured to the mouthpiece assembly 40. The process by which the support mechanism can be attached to the filter medium or mouthpiece includes any method that will secure the support mechanism to the filter medium or mouthpiece.

The mouthpiece of the present invention can be any of those mouthpieces presently used in connection with a spirometer, such as the prior art mouthpiece shown in FIG. 6, that disclosed in U.S. Pat. No. 4,895,143, or any other mouthpiece having an interior conduit portion to which a support structure and bag or sock filter can be attached.

In one embodiment of the invention, an electrostatic polypropylene medium is manufactured with polypropylene fibers. A polypropylene screen or mesh is attached to the polypropylene filter medium by a heat staking process which melts the two materials together by using a melting temperature that is common to polypropylene.

The polypropylene screen or mesh may be heat staked to the polypropylene filter medium about the outer edges of the filter sock 43 such that the screen or mesh is adjacent the filter media, or it may be heat staked to the filter medium over the entire surface thereof, so that the screen or mesh is in intimate contact with the filter media.

The screen or mesh may cover all, or a portion of the inside and/or outside wall of the filter media.

Figure 8:
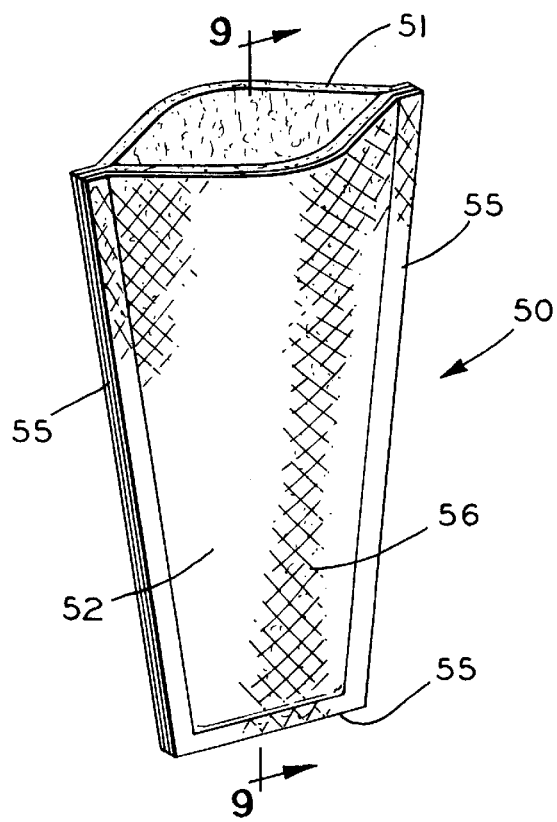
FIG. 8 is a perspective view of a reinforced filter media embodying the construction of the present invention and having a support structure attached to one side only of the filter media.
Figure 9:
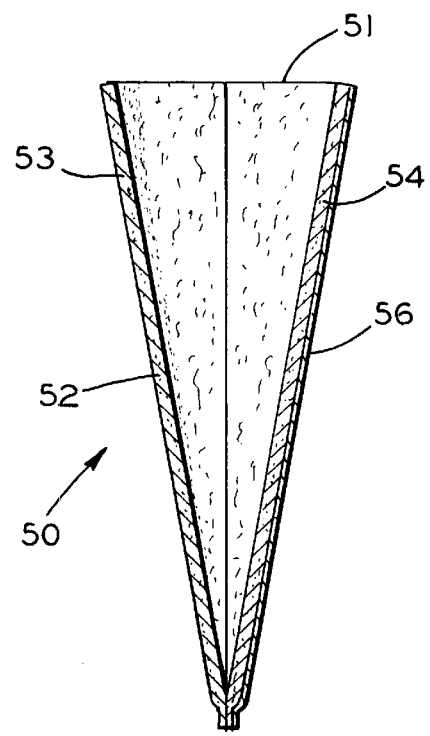
FIG. 9 is a sectional view, taken in the direction of the arrows, along the section line 9—9 of FIG. 8.

Referring now to FIGS. 8 and 9, there is shown the improved, reinforced, filter sock or bag 50 embodying the construction of the present invention. The filter sock 50 may be of a one piece construction, or a multi-piece construction. For ease of understanding, the following examples have a two-piece construction illustrated. In can be understood by those skilled in the art, that the present invention is applicable to any filter sock or bag, regardless of size, construction, or application.

The filter sock or bag 50 has a rim portion 51 and a bag portion 52. The filter sock 50 is formed of a first piece of filter media 53 and a second piece of filter media 54 heat staked, sonic welded, bonded or adhesively fastened together about the edge 55 of the filter sock 50. A reinforcing means, such as mesh 56, has been heat staked, sonic welded, bonded or adhesively fastened to one side of the second piece of media 54, about the edge region 55 of the filter sock 50. If the mesh is only heat staked at the edge 55 it is said to be adjacent the second piece of filter media 54 during normal operation rather than in intimate contact. If, for example the mesh 56 had been sonically welded, adhesively adhered or bonded or attached by any other method to the surface of the second piece of media 54 such that all of the mesh 56 was fastened to the first piece of media 54 it, would be said that the mesh is in intimate contact with the media. Either modification is satisfactory.

Figure 10:
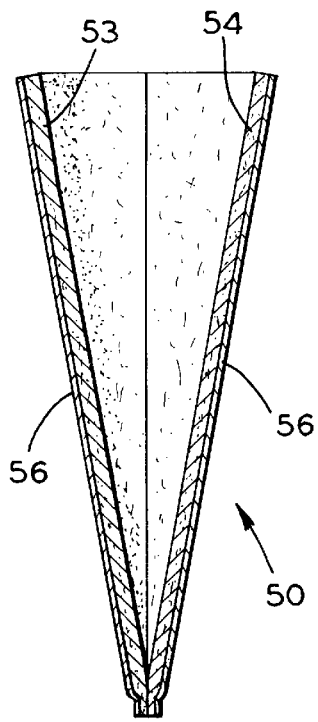
FIG. 10 is a view, similar in part to FIG. 8, but showing the support structure attached to both sides of the outside of the filter media.

As is shown in FIG. 10, the mesh 56 which is, in a preferred embodiment, a polypropylene mesh, may be attached to the outside of the first piece of media 53, as well as to the outside of the second piece of media 54, using a method in which the media is either adjacent to or in intimate contact with the media.

Figure 11:
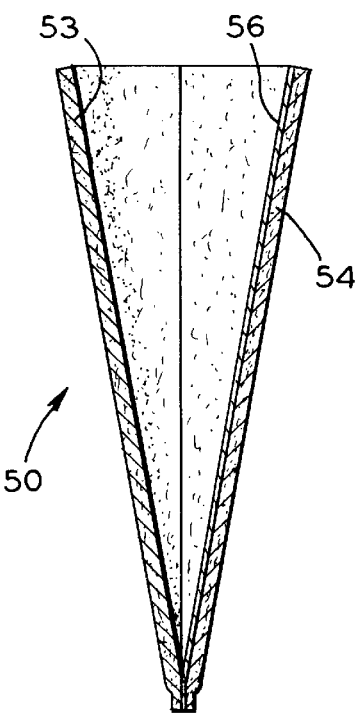
FIG. 11 is a view, similar in part to FIG. 8, but showing the support structure attached to the inside of one side of the filter media.

As shown in FIG. 11, the mesh 56 can also be attached, depending on the application, to the inside of the first piece of media 53 and/or the second piece of media 54.

Figure 12:
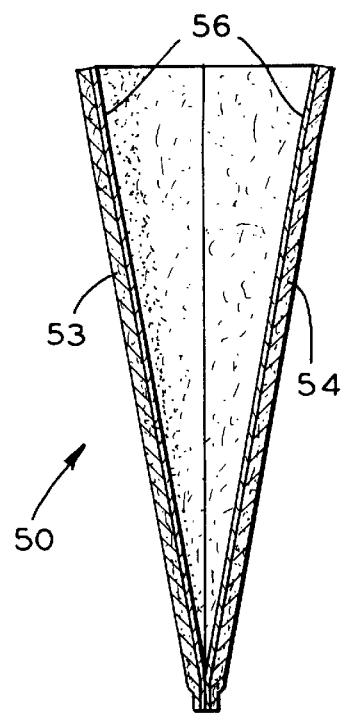
FIG. 12 is a view, similar in part to FIG. 8, but showing the support structure attached to both sides of the inside of the filter media.

As can been seen in FIG. 12, the mesh 56 can be attached to the inside of both, the media 53 and the media 54.

Figure 13:
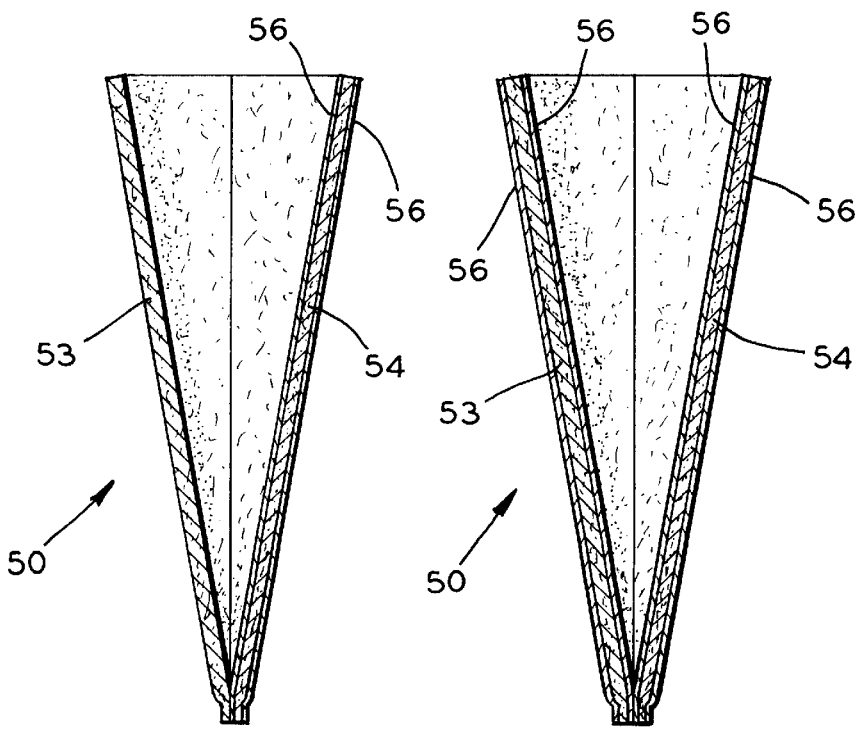
FIG. 13 is a view, similar in part to FIG. 8, but showing the support structure attached to both sides of one side of the filter media.

As can been seen in FIG. 13, the mesh can be attached to the inside and the outside of one of the pieces of filter media, such as the second piece of filter media 54.

Figure 14:
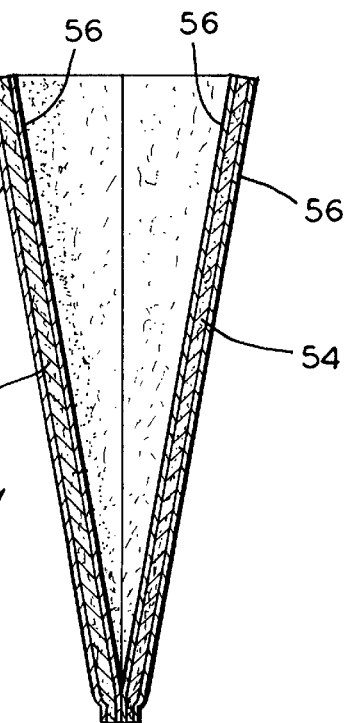
FIG. 14 is a view, similar in part to FIG. 8, but showing the support structure attached to the entire inside and outside of both sides of the filter media.

As shown in FIG. 14, the mesh or reinforcement structure 56 can be adjacent or in intimate contact with both sides of both the first piece of filter media 53 and the second piece of filter media 54.

Figures 15, 16:
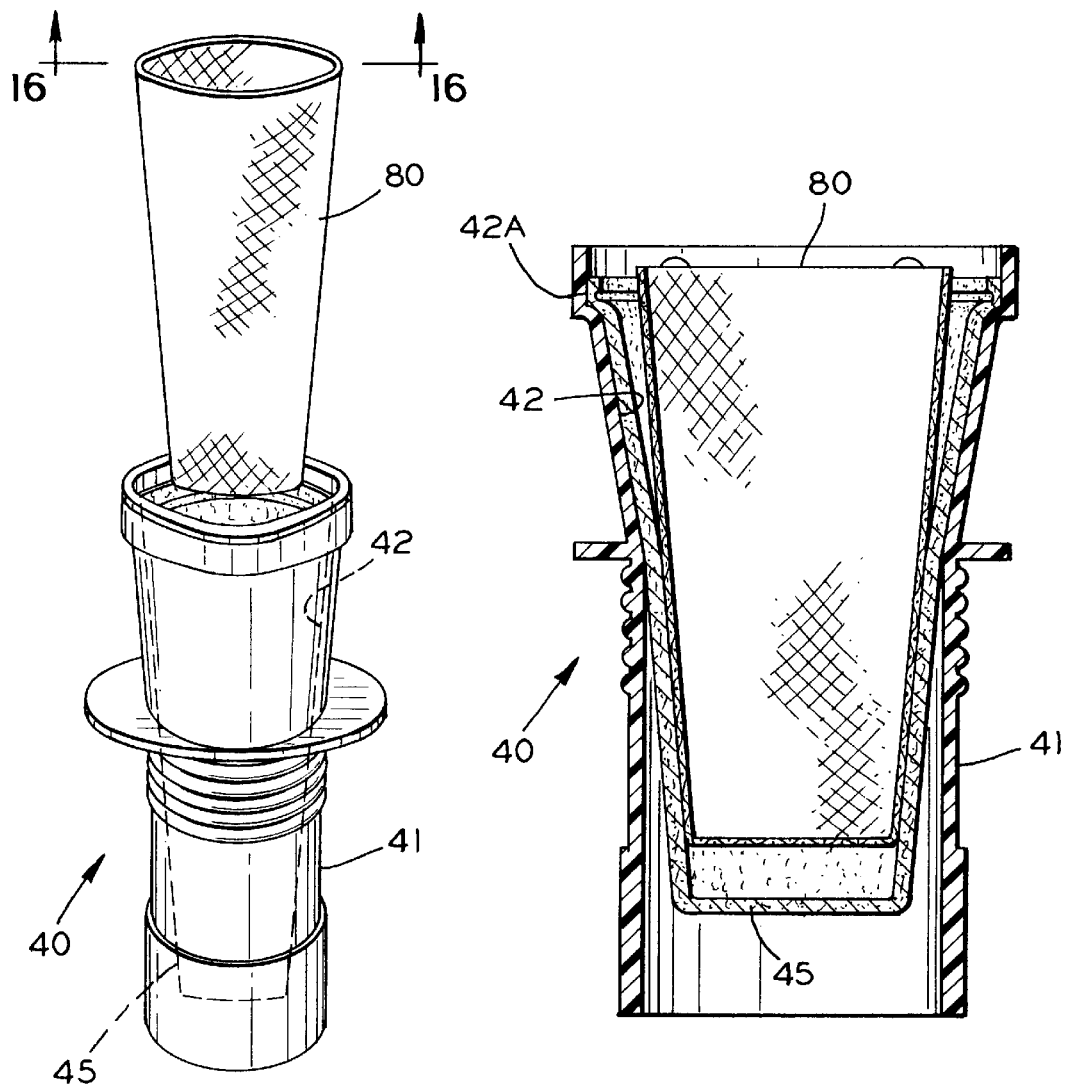
FIG. 15 is an exploded, perspective view, of a modification of the construction of the present invention.
FIG. 16 is a sectional view, taken in the direction of the arrows, along the section line 16—16 of FIG. 15.

With reference to FIGS. 15 and 16, there is shown a modification of the present invention. In this modification, a rigid support structure 80 of suitable shape is inserted in the prior art mouthpiece/filter assembly 40, as shown in FIG. 6. The rigid support structure will be of a complementary shape to the prior art mouthpiece in which it is installed, so that it may be easily fastened in place, such as by heat staking, sonic welding, bonding or adhesive fastening. In the embodiment shown, the reinforcement structure 80 is shown of a cone shape, and is fastened to the filter media about its lower periphery. The reinforcement structure 80 could also be of a complimentary shape to the housing 41 and be heat staked to the inner periphery 42A of the conduit 42 together with the filter sock 43.

Thus, by carefully analyzing the problems present in prior art spirometric filter devices a novel and improved filter media and filter assembly have been developed.

What is claimed is:

1. A reinforced filter sock having a rim portion and a bag portion, said filter sock being reinforced by a reinforcing mesh adjacent to at least a portion of said filter sock.

2. The filter sock defined in claim 1, wherein said reinforcing filter mesh is in intimate contact with at least a portion of said filter sock.

3. The filter sock defined in claim 1, and being of a two-piece construction.

4. The filter sock defined in claim 2, and being of a two-piece construction.

5. The filter sock defined in any one of claims 3 or 4, said filter sock comprising:

a) a first piece of filter medium having edge regions, b) a second piece of filter medium having edge regions, said first piece of filter medium being fastened to said second piece of filter medium about their respective edge regions to form said filter sock having a rim portion and a bag portion, said filter sock having an edge region.

6. The filter sock defined in claim 5, wherein said reinforcing mesh is attached to only one piece of said filter medium.

7. The filter sock defined in claim 6, wherein said reinforcing mesh is attached to the exterior of only one piece of said filter medium.

8. The filter sock defined in claim 7, wherein said reinforcing means is attached to said interior of only one piece of said of said filter medium.

9. The filter sock defined in claim 8, wherein said reinforcing mesh is attached to said interior of each of said first and said second piece of said filter medium.

10. The filter sock defined in claim 9, wherein said reinforcing mesh is attached to the interior and the exterior of one of said first and said second piece of said filter medium.

11. The filter sock defined in claim 10, wherein said reinforcing means is attached to said interior and said exterior of both said first piece and said second piece of said filter medium.

12. The filter sock defined in claim 11, wherein said first piece and said second piece of filter medium is an electrostatic filter medium.

13. The filter sock defined in claim 12, wherein said electrostatic filter medium is one of the group consisting of an electret filter medium and triboelectric filter medium.

14. The filter sock defined in claim 13, wherein said electrostatic filter medium is constructed from one of the group consisting of woven, non-woven, and synthetic.

15. The filter sock defined in any one of claims 1 or 2, forming a portion of a spirometer mouthpiece assembly having a bag or sock filter medium, comprising:

(a) said mouthpiece having an interior conduit;

(b) said filter sock having an exterior and an interior, having a rim portion and a bag portion; and (c) a reinforcing support mechanism;

whereby said filter medium is attached to said conduit of said spirometer mouthpiece assembly.

16. The assembly as claimed in claim 15, wherein said support mechanism is constructed from one of the group consisting of a screen and a mesh.

17. The assembly as claimed in claim 15, wherein said support mechanism is attached to a portion of said filter medium.

18. The assembly as claimed in claim 17, wherein said support mechanism is attached to said interior of said filter medium.

19. The assembly as claimed in claim 17, wherein said support mechanism is attached to said exterior of said filter medium.

20. The filter sock defined in any one of claims 1 or 2, forming a portion of a spirometer mouthpiece assembly having a bag or sock filter medium, said spirometer mouthpiece assembly comprising:

(a) a mouthpiece having an interior conduit;

(b) said filter sock having an exterior and an interior, a rim portion, and a bag portion; and (c) a reinforcing support mechanism;

whereby said filter medium is attached to said conduit of said spirometer mouthpiece assembly, and said reinforcing support mechanism is also attached to said conduit of said spirometer mouthpiece assembly.

21. The assembly as defined in claim 20, wherein said reinforcing support mechanism is secured to said interior conduit of said mouthpiece, and said filter medium is attached to said conduit of said mouthpiece adjacent to said support mechanism.

22. The assembly as claimed in claim 21, wherein said reinforcing support mechanism is a rigid polypropylene support mechanism, and said filter medium is attached to said interior conduit of said mouthpiece and said support mechanism is attached to said rim portion of said filter medium.

* * * * *